(12) United States Patent
Hachikian et al.

(10) Patent No.: US 7,799,383 B2
(45) Date of Patent: Sep. 21, 2010

(54) SURFACE ACTIVATED ADHESIVE SYSTEMS

(75) Inventors: Zakar Raffi Hachikian, Belmont, MA (US); Sevan Demirdogen, Danvers, MA (US)

(73) Assignee: Illinois Tool Works, Inc., Glenview, IL (US)

( * ) Notice: Subject to any disclaimer, the term of this patent is extended or adjusted under 35 U.S.C. 154(b) by 415 days.

(21) Appl. No.: 10/955,708

(22) Filed: Sep. 30, 2004

(65) Prior Publication Data

US 2006/0065364 A1    Mar. 30, 2006

(51) Int. Cl.
B31B 1/62 (2006.01)
C09J 5/00 (2006.01)
B05D 3/10 (2006.01)
C08L 31/06 (2006.01)
C08L 33/14 (2006.01)
C08F 8/00 (2006.01)

(52) U.S. Cl. .................. 427/300; 427/299; 427/322; 427/421.1; 156/60; 156/314; 524/558; 524/559; 525/192; 525/213; 525/222; 525/232

(58) Field of Classification Search .............. 427/299, 427/300, 322, 421.1; 525/192–194, 213, 525/222, 232; 524/558, 559; 156/30, 314
See application file for complete search history.

(56) References Cited

U.S. PATENT DOCUMENTS

| 3,189,509 | A | | 6/1965 | Needham |
| 3,920,497 | A | | 11/1975 | Speer |
| 4,052,244 | A | * | 10/1977 | Skoultchi .................. 156/310 |
| 4,135,017 | A | | 1/1979 | Hoffmann, Sr. |
| 4,237,242 | A | | 12/1980 | Frankel |
| 4,430,480 | A | * | 2/1984 | Melody et al. ............. 525/160 |
| 4,568,589 | A | | 2/1986 | Briggs |
| 4,617,078 | A | | 10/1986 | Takahaski et al. |
| 6,462,126 | B1 | | 10/2002 | Gosiewski et al. ......... 524/560 |
| 6,734,249 | B1 | * | 5/2004 | Bulluck et al. ............. 524/558 |
| 6,852,801 | B1 | * | 2/2005 | Briggs et al. ............... 525/212 |
| 6,949,602 | B2 | * | 9/2005 | Gosiewski et al. .......... 525/65 |

FOREIGN PATENT DOCUMENTS

EP    0867491 A1    9/1998
JP    58166303 A  * 10/1983

* cited by examiner

*Primary Examiner*—Timothy H Meeks
*Assistant Examiner*—Cachet I Sellman
(74) *Attorney, Agent, or Firm*—Gardere Wynne Sewell, LLP

(57) ABSTRACT

Methods for adhesive bonding are disclosed. The methods includes contacting a substrate with an activator composition which includes a reactive solvent, such as methyl ethyl ketone or acrylic-based monomers, and a reducing agent, such that the treated substrate has a working time of greater than about four weeks, and contacting the substrate with adhesive compositions to result in adhesive bonding.

36 Claims, No Drawings

SURFACE ACTIVATED ADHESIVE SYSTEMS

TECHNICAL FIELD OF THE INVENTION

The present invention relates generally to the field of adhesives, and more particularly, to methods for pre-activating substrates for adhesive bonding.

BACKGROUND OF THE INVENTION

Without limiting the scope of the invention, its background is described in connection with adhesives used in the assembly of various substrates.

Acrylic-based adhesives have been used in a wide variety of applications. For example, U.S. Pat. Nos. 4,942,201 and 4,714,730, assigned to ITW of Glenview, Ill., the assignee of the present invention, the contents of which are incorporated herein by reference, describe adhesives made with methacrylate and acrylate based adhesives, together with various other additives and ingredients, for use in the assembly of various products ranging from small component parts such as PVC pipe, to larger objects such as busses and boats.

Many available adhesives, however, have exhibited certain inadequacies in their potential application to various construction substrates. For example, many so-called "reactive" adhesives must be combined with a catalyst or other promoter in order for polymerization to take place. Oftentimes, these catalyst promoters are either mixed with the main adhesive component so that the adhesive, when applied, is ready to bond, or the various component parts are kept separate and then mixed when bonding is desired. This mixing/combining step can add significant time to the assembly process, and can oftentimes be very tedious.

In addition, many reactive adhesives cure too fast, thus not allowing the assembler adequate time to assemble the component parts before bonding, or conversely, cure too slow, thus complicating the assembly process, especially for small, intricate objects where a fast cure is desired. Similarly, while many adhesives offer easy application procedures and acceptable level of adhesion, their performance is lacking in chemical resistance and ability to withstand exposure to high temperatures.

Furthermore, many adhesives exist and are applied in liquid form. As such, because of the difficulty in transporting substrates that have liquid adhesive components already applied, assemblers are forced to apply the adhesives to the desired substrates at the location of assembly. This can of course lengthen the assembly process.

As such, there is a need for reactive adhesives that can be easily applied to a wide variety of substrates, while exhibiting high performance characteristics and a wide time window for curing before final assembly. In addition, there is a need for reactive adhesives that can be employed in ways that will improve the application of the adhesive, and that will improve the overall assembly process of substrates to which the adhesive is applied.

SUMMARY OF THE INVENTION

The present invention is directed to pre-activated surface adhesives and methods for pre-activating substrates for adhesive bonding. One embodiment of the present invention is a method for adhesive bonding using a two-part adhesive having an activator part and an adhesive part. The method contains the steps of (1) contacting a substrate with the activator part to form a treated substrate, where the activator part contains a solvent capable of being absorbed by the substrate and at least one pyridine reducing agent, wherein the treated substrate has a working time of less than about 10 weeks, and (2) contacting the treated substrate with the adhesive part, where the adhesive part contains acrylic-based monomers generally of the structure:

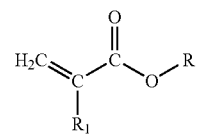

where R is a functional group containing in the range of from about 1 to about 20 carbon atoms and $R_1$=H or $CH_3$, and also contains at least one sulfur-containing compound, and an oxidizing agent selected from the group consisting of peroxides, hydroperoxides, peresters, peracids and the like and mixtures thereof.

In another embodiment of the present invention, a method for pre-activating the surface of a substrate for adhesive bonding is described. The method includes (1) contacting the surface of a substrate with a composition containing a solvent, which contains either methyl ethyl ketone or methyl methacrylate monomer, or both, and at least one pyridine reducing agent to form a treated substrate; and (2) drying the treated substrate so that the surface of the treated substrate contains no residue.

In another embodiment of the present invention, a method for adhesive bonding using a two-part adhesive having an activator part and an adhesive part is described. The method includes the steps of (1) contacting a substrate with the activator part to form a treated substrate, the activator part comprising a solvent, which contains either methyl ethyl ketone or methyl methacrylate monomer, or both, and dihydropyridine, to form a treated substrate, and (2) contacting the treated substrate with the adhesive part, the adhesive part comprising methyl methacrylate, at least one sulfur-containing compound, and cumene hydroperoxide.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention, and are not meant to limit the scope of the invention.

Adhesives of the present invention may be made by the combination of at least two parts: an adhesive part and an activator part. The adhesive part generally contains acrylic-based monomers, carboxylic acids, sulfur-containing compounds, and at least one oxidizing agent. The adhesive part also may contain other components such as impact modifiers, color agents, stabilizers, waxes and the like. The activator part generally is made up of a reactive solvent such as methyl ethyl ketone or a acrylic-based monomers, such as methyl methacrylate or mixtures thereof, and a reducing agent. Adhesives of the present invention also may contain other components, which may affect the end-characteristics of the adhesive (such as texture, color, fragrance, etc.).

Monomers

Monomers useful in the present invention generally include acrylic-based monomers that are copolymerized during the curing process. As used herein, the term acrylic-based monomer or acrylic-based adhesive component is used generically and generally refers to compounds exhibiting the chemical structure:

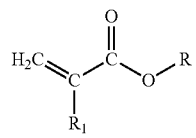

Where $R_1$, for example, may be hydrogen, a methyl group or an ethyl group, and R may be hydrogen, or a functional group containing in the range of from about 1 to about 20 carbon atoms. Such compounds may be linear, branched, cyclic, unsaturated, or saturated and can contain various functional groups. In one embodiment of the present invention, R is a functional group containing in the range of from about 1 to about 20 carbon atoms. In another embodiment of the present invention, R equals $C_nH_{2n+1}$ where n is in the range of from about 1 to about 20. In another embodiment of the present invention, R equals $C_nH_{2n+1}$ where n is in the range of from about 1 to about 20 and contains other functional groups such as for example, hydroxyl groups, ether linkages, cyclic groups or other functional groups. In another embodiment of the present invention, R equals $C_nH_{2n+1}$, and one or more of the hydrogen molecules are replaced with functional groups.

"Acrylic-based," as used herein, is defined to encompass both acids and salts of acids. For example, acrylic-based compounds may include acrylic acid and acrylates. Acrylic-based compounds may include acrylate-based, and methacrylate based compounds. The terms acrylic-, acrylate-, and methacryate-based, are simply a convenient means for labeling where functional groups are located on an adhesive component and are used interchangeably. Using the structure above as an example, when R and $R_1$ are both hydrogen, the acrylic-based adhesive component is known as acrylic acid (an organic acid). When R is hydrogen, and when $R_1$ is a methyl group, the acrylic-based adhesive component is known as methacrylic acid. When R is a methyl group, and $R_1$ is hydrogen, the acrylic-based adhesive component is known as methyl acrylate, and the acrylic-based adhesive component is said to be acrylate-based. Acrylate-based components generally exhibit the chemical structure ($H_2C=CH-COOR$). When R and $R_1$ are both methyl groups, the acrylic-based adhesive component is known as methyl methacrylate (MMA), and is said to be methacrylate-based. Methacrylate-based components generally exhibit the chemical structure ($H_2C=CCH_3COOR$).

Acrylic-based monomers useful in the present invention include, but are not limited to, acrylate-based, and methacrylate-based monomers, and generally have a Tg (second order glass transition temperature) generally above 80° C. Acrylate-based monomers include acrylate esters wherein the alcohol portion of the ester contains from about one to about twenty carbon atoms. Examples of which include, but are not limited to, methyl acrylate, ethyl acrylate, butyl acrylate, 2-ethylhexyl acrylate, and the like and mixtures thereof. Methacrylate-based monomers include methacrylate ester monomers wherein the alcohol portion of the ester group contains from about one to about twenty carbon atoms. Examples of such ester monomers include, but are not limited to, methyl methacrylate, ethyl methacrylate, 2-ethylhexyl methacrylate, cyclohexyl methacrylate, laurel methacrylate, methoxy polyethylene glycol monomethacrylate, ethoxy-lated bisphenol A dimethacrylate, and the like and mixtures thereof. Butyl methacrylate and tetra hydrofurfuryl methacrylate may also be used. Other useful monomers include acrylonitrile, methacrylonitrile, styrene, vinyl toluene, and the like and mixtures thereof.

Adhesives of the present invention contain acrylic-based monomers present in an amount sufficient to form adhesives that offer flexible application properties. In one embodiment of the present invention, acrylic-based monomers are present in an amount in the range of from about 5 to about 75 weight percent, based on the weight of the adhesive. In another embodiment of the present invention, acrylic-based monomers are present in an amount in the range of from about 30 to about 65 weight percent, based on the weight of the adhesive. In another embodiment of the present invention, acrylic-based monomers are present in an amount in the range of from about 50 to about 60 weight percent of the adhesive.

In one embodiment of the present invention, at least one of the acrylic-based monomers is a low molecular weight monomer. Generally, low molecular weight monomers useful in the present invention exhibit the formula $H_2C=CR_1COOR$, where $R_1$ is H or $CH_3$ and R is a functional group containing less than about 2 carbon atoms. An example of such a low molecular weight monomer is MMA or methyl methacrylate. In one embodiment of the present invention, low molecular weight monomers are present in an amount generally greater than about 40 percent of the acrylic-based monomers. In another embodiment of the present invention, low molecular weight monomers are present in an amount in the range of from about 40 to about 70 percent of the acrylic-based monomers.

Long chain or high molecular weight monomers may be used in combination with lower molecular weight monomers to improve various characteristics of the adhesives. Generally, high molecular weight monomers useful in the present invention exhibit the formula $H_2C=CR_1COOR$, where $R_1$ is H or $CH_3$ and R is a functional group containing greater than 2 carbon atoms. In one embodiment of the present invention, at least one of the acrylic-based monomers is a long chain or high molecular weight monomer where R is a functional group containing in the range of from about 10 to about 18 carbon atoms. Examples of such high molecular weight monomer include, but are not limited to, laurel methacrylate, methoxy polyethylene glycol monomethacrylate, 1,3-Propanediol, 2-ethyl-2-hydroxymethyl-trimethacrylate (Trade name—Sartomer 350), and P2M (2-hydroxyethylmethacrylate phosphoric acid partial ester) (available from Kyoeisha Chemical Co.). In one embodiment of the present invention, high molecular weight monomers are present in an amount in the range of less than about 20 percent of the acrylic-based monomers. In another embodiment of the present invention, high molecular weight monomers are present in an amount in the range of from about 2 to about 10 percent of the acrylic-based monomers.

Additional monomers that may be used in connection with acrylic-based monomers are free radical polymerizable ethylenically unsaturated mono or polycarboxylic acids. Such acids serve to enhance bondability of the adhesives to the substrates and also to increase shelf life and work life formula. Examples of such acids include, but are not limited to those described in U.S. Pat. Nos. 4,959,405, 4,714,730, and 4,773,957, the entireties of which are herein incorporated by reference. Other examples include acrylic acid, methacrylic acid and salts thereof, and the like and mixtures thereof. In one embodiment of the present invention, zinc salts of methacrylic acids are used. In one embodiment of the present invention, the organic acid is present in an amount in the range of from about 2 to about 20 weight percent, based on the weight of the adhesive. In another embodiment of the present invention, the organic acid is present in an amount in the range of from about 3 to about 15 weight percent, based on the weight of the adhesive. In another embodiment of the present invention, the organic acid is present in an amount in the range of from about 4 to about 10 weight percent, based on the weight of the adhesive.

Impact Modifiers

In one embodiment of the present invention, the adhesive includes at least one impact modifier. In one embodiment of the present invention, the impact modifier contains a core-shell graft co-polymer. Core-shell graft copolymer resins useful in the present invention generally have a rubbery core and a hard outer shell, and swell in the adhesive mixture but do not dissolve therein. The adhesives, so formulated, exhibit improved spreading and flow properties that are highly desirable in many adhesive applications. For example, when an adhesive is applied to an article by means of a syringe-type application, many adhesives string out between the point where the applicator was applied and the next position of the applicator. With the present invention, a small drop of adhesive may be applied to the article to be bonded with no adhesive string-out formed. The core or backbone polymer of the graft copolymer has a glass transition temperature substantially below ambient temperature. The shell polymer that is grafted onto the backbone polymer has a glass transition temperature substantially above ambient temperatures.

Examples of useful core-shell graft copolymers are those where hard containing compounds, such as styrene, acrylonitrile or methyl methacrylate, are grafted onto a rubbery core made from polymers of soft or elastomeric containing compounds such as butadiene or ethyl acrylate. U.S. Pat. No. 3,985,703, which is herein incorporated by reference, describes useful core-shell polymers, the cores of which are made from butyl acrylate but can be based on ethyl isobutyl, 2-ethylhexel or other alkyl acrylates or mixtures thereof. In addition, U.S. Pat. No. 5,206,288, which is herein incorporated by reference, describes useful impact modifiers for use in low temperature applications.

The core polymer, may optionally contain up to 20 weight percent of other copolymerizable containing compounds, such as styrene, vinyl acetate, methyl methacrylate, butadiene, isoprene, and the like. The core polymer may optionally contain up to 5 weight percent of a cross linking monomer having two or more nonconjugated double bonds of approximately equal reactivity such as ethylene glycol diacrylate, butylene glycol dimethacrylate, and the like. It also optionally may contain up to 5 weight percent of a graft linking monomer having two or more nonconjugated double bonds of unequal reactivity such as, for example, diallyl maleate and allyl methacrylate.

The shell portion may be polymerized from methyl methacrylate and optionally other lower alkyl methacrylates, such as ethyl, butyl, or mixtures thereof. Up to about 40 percent by weight of the shell monomers may be styrene, vinyl acetate, vinyl chloride, and the like. Additional core-shell graft copolymers useful in embodiments of the present invention are described in U.S. Pat. Nos. 3,984,497; 4,096,202; 4,034,013; 3,944,631; 4,306,040; 4,495,324; 4,304,709; and 4,536,436, the entireties of which are herein incorporated by reference. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

In one embodiment of the present invention MBS impact modifiers are used. In another embodiment of the present invention, ABS impact modifiers are used. Generally, these impact modifiers contain up to about 80% by weight butadiene and exhibit improved cold impact performance. In another embodiment of the present invention, butadiene is present in an amount greater than about 70% by weight. In another embodiment of the present invention, butadiene is present in an amount greater than 50% by weight.

Examples of useful impact modifiers include, but are not limited to, Paraloid KMBTA 753, commercially available from Rohm & Haas Co., Blendex B983, commercially available from GE Specialty Chemicals, and KANEACE B-564, commercially available from Kaneka Texas Corporation. Other impact modifiers useful in the present invention include those disclosed in U.S. Pat. Nos. 5,112,691 and 4,942,201, the entireties of which are incorporated herein by reference. Adhesives of the present invention contain impact modifiers present in an amount sufficient to form adhesives that are impact and heat resistant and have increased adhesive bonding capabilities in both cold and hot environments. In addition, such impact modifiers provide improved non-sag, thixotropic and anti-sliding properties. Generally, impact modifiers may be present in an amount up to about 30 weight percent, based on the weight of the adhesive. In one embodiment of the present invention, impact modifiers are present in an amount in the range of from about 2 to about 30 weight percent, based on the weight of the adhesive. In another embodiment of the present invention, impact modifiers are present in an amount in the range of from about 4 to about 25 weight percent, based on the weight of the adhesive. In another embodiment of the present invention, impact modifiers are present in an amount in the range of from about 6 to about 20 weight percent, based on the weight of the adhesive.

Polymerization Systems

It is generally known in the art that polymerization of acrylic-based monomers proceeds by a free radical addition polymerization mechanism. Useful examples of acrylic-based curing systems include, but are not limited to, systems that combine hydroperoxide oxidizing agents with pyridine reducing agents. These systems generally use oxidizing agents such as peroxides (for example, hydroperoxide), peresters, peracids, and the like and mixtures thereof, in combination with pyridine reducing agents (such as for example dihydropyridine) to generate radicals which polymerize the acrylic-based monomer(s). Curing systems based on peroxide/pyridine systems are described in U.S. Pat. No. 6,462,126, the entirety of which is incorporated herein by reference.

Useful examples of reducing agents include, but are not limited to, tertiary amines such as N,N-dimethylaniline; N,N-dimethyltoluidine; N,N-diethylaniline; hydroxyethyl toluidine, N,N-diethyltoluidine, and the like, and mixtures thereof. Other tertiary amines useful include those described in U.S. Pat. No. 4,112,023, the entirety of which is incorporated herein by reference. In one embodiment of the present invention, reducing agents may be used in an amount in the range of from about 0.1 to about 3 weight percent, based on the weight of the adhesive. In another embodiment, reducing agents may be used in an amount in the range of from about 0.25 to about 2 weight percent, based on the weight of the adhesive. In another embodiment, reducing agents may be used in an amount in the range of from about 0.5 to about 1.5 weight percent, based on the weight of the adhesive.

Other reducing agents useful in the present invention may also include aldehyde-amine condensation products. An example of an aldehyde-amine condensation product is one made from butylaldehyde and a primary amine, such as for example, aniline or butylamine. In one embodiment of the present invention, Reillcat™ ASY-2 "Reilly", an aldehyde amine condensation product, is used. Condensation products of aliphatic aldehydes with aliphatic or aromatic amines may also be used.

An organic substance having one or more sulfonyl chloride moieties may be used to react with these reducing agents. In one embodiment of the present invention, the sulfonyl chloride-containing compound is Hypalon 30, a chlorosulfonated polyethylene compound. In one embodiment of the present invention, the sulfonyl chloride-containing compound may be used in an amount of up to about 50 weight percent, based on the total weight of the composition. In another embodiment of the present invention, sulfonyl chloride-containing compound may be used in an amount in the range of from about 10 to about 40 weight percent, based on the total weight of the composition. In another embodiment of the present invention, sulfonyl chloride-containing compound may be used in an amount in the range of from about 15 to about 30 weight percent, based on the weight of the composition.

In one embodiment of the present invention, the catalyst system contains an oxidizing agent and a reducing agent, wherein the oxidizing agent is selected from the group consisting of peroxides, hydroperoxides, peresters, and peracids and the like and mixtures thereof, and wherein the reducing agent is selected from the group consisting of amines, and aldehyde-amine condensation products. In another embodiment of the present invention, the catalyst system contains an oxidizing agent and a reducing agent, wherein the oxidizing agent is cumene hydroperoxide and wherein the reducing agent is dihydropyridine. In another embodiment of the present invention, the catalyst system contains a sulfonyl chloride containing compound, an oxidizing agent, and a reducing agent, wherein the oxidizing agent is selected from the group consisting of peroxides, hydroperoxides, peresters, and peracids and the like and mixtures thereof, and wherein the reducing agent is selected from the group consisting of amines, and aldehyde-amine condensation products, and wherein the sulfonyl chloride containing compound is chlorosulfonated polyethylene, such as Hypalon 30.

Sulfonyl chloride containing compounds, such as organic sulfonyl chloride derivatives may be used as the accelerator of the catalyst system. Examples of sulfonyl chloride containing compounds include, but are not limited to, propane sulfonyl chloride and para-toluene sulfonyl chloride. A chlorosulfonated polyethylene polymer useful in the present invention is described in U.S. Pat. Nos. 3,890,407; 4,112,013; and 4,182,644, the entireties of which are herein incorporated by reference. The chlorosulfonated polyethylene polymer of the present invention may contain in the range of from about 25 to about 70 weight percent chlorine and from about 3 to about 160 millimoles of sulfonyl chloride moiety per 100 grams thereof.

In one embodiment of the present invention, a chlorosulfonated polyethylene polymer resin is prepared from branded polyethylene and marketed under the trademark "HYPALON 30" that is commercially available from Du Pont. The HYPALON 30 brand of chlorosulfonated polyethylene polymer resin used contains about 43% by weight chlorine and about 34 millimoles of sulfonyl chloride moiety per 100 grams of polymer resin, and is made from branched polyethylene having a melt index of about 100. Other useful examples of chlorosulfonated polyethylene polymer resins for use in various embodiments of the present invention are described in U.S. Pat. No. 4,536,546, the entirety of which is herein incorporated by reference.

Polymerization Catalysts

According to one embodiment of the present invention, a catalyst is used to initiate the polymerization reaction. The term "catalyst," as used herein, describes at least one of the following: (a) a free-radical generator, (b) an initiator, (c) a promoter, (d) an accelerator. In addition, the term catalyst includes oxidizing and reducing agents. Catalysts useful in the present invention may include polymerization catalysts with or without other components that enhance the reactivity of the catalysts. Catalysts useful in the present invention are generally free radical generators that trigger the polymerization of acrylic-based monomers. Free-radical generators useful in the present invention, include, but are not limited to, peroxides, hydroperoxides, peresters, peracids, and the like, and mixtures thereof. These catalysts may be activated with radiant energy such as ultraviolet light or heat. Examples of useful catalysts include, but are not limited to, diacyl peroxides, dialkyl peroxides, benzoyl peroxide, dibenzoyl peroxide, cumene hydroperoxide, tertiary butyl hydroperoxide, dicumyl peroxide, tertiary butyl peracetate, tertiary butyl perbenzoate, ditertiary butyl azodiisobutylnitrile, and the like, and mixtures thereof. In one embodiment of the present invention, the catalyst is cumene hydroperoxide.

One embodiment of the present invention uses free-radical-producing catalysts in amounts up to about 25 weight percent based on the weight of the total composition. In another embodiment, catalysts may be used in the range of from about 0.1 to about 20 weight percent based on the weight of the total composition. In another embodiment, catalysts may be used in amounts in the range of from about 0.20 to about 15 weight percent, based on the weight of the total composition. In another embodiment, catalysts may be used in amounts in the range of from about 0.3 to about 12 weight percent, based on the weight of the total composition.

In one embodiment of the present invention, the catalyst system contains an oxidizing agent and a reducing agent, wherein the oxidizing agent is selected from the group consisting of peroxides, hydroperoxides, peresters, peracids and the like and mixtures thereof, and wherein the reducing agent is a pyridine compound. In another embodiment of the present invention, the catalyst system contains an oxidizing agent and a reducing agent, wherein the oxidizing agent is cumene hydroperoxide and wherein the reducing agent is dihdropyridine.

Other components may be added to the adhesive for various desired properties such as improved shelf life, curing profiles, and adhesive qualities. These components may be used in either the activator or the adhesive side of the adhesive, in whole or in part, and may be moved from the side to side as desired. For example, inhibitors/retarders may be added to suppress polymerization of the monomers by reacting with the initiating and propagating radicals and converting them either to non-radical species or radicals of reactivity too slow to undergo propagation. Examples of useful inhibitors/retarders may be found in *Principles of Polymerization*, 3rd ed., by Odian (Wiley Interscience), the entirety of which is incorporated herein by reference. Such inhibitors/retarders may be present generally in an amount in the range of from about 0.001 to about 3 weight percent, based on the weight of the adhesive. In another embodiment, the inhibitor/retarder may be present in an amount in the range of from about 0.001 to about 1.5 weight percent, based on the weight of the adhesive. In another embodiment, the inhibitor/retarder may be present in an amount in the range of from about 0.001 to about 1.2 weight percent, based on the weight of the adhesive.

Other components that may enhance the reactivity of the catalyst include promoters, initiators, and accelerators. Promoters useful in the present invention generally may include an organic salt of a transition metal such as, for example, cobalt-, nickel-, manganese-, or iron-naphthenate, copper-octoate, copper acetyl acetonate, iron hexoate, or iron propionate. Promoters may be added to aid heat induced peroxide decomposition. In one embodiment of the present invention, promoters may be used in amounts of up to about 0.5 weight percent, based on the total weight of the composition. In another embodiment of the present invention, promoters may be used in amounts in the range of from about 1 part per million to about 0.5 weight percent, based on the total weight of the composition.

Other components that may be added to adhesives of the present invention include, but are not limited to, paraffin waxes, chain transfer agents, pigments, fragrances and thickening agents. Thickening agents are generally used to modify the viscosity, specific gravity, and thixotropic properties of the adhesives. Such thickening agents include, but are not limited to, inorganic and organic fillers, and/or inert polymers that may be dissolved, swollen or suspended in the carrier.

Surface Activation

Adhesives of the present invention may be prepared in two parts generally described as the adhesive component and the activator component. One side of the adhesive contains the free radical catalyst(s) and the other part contains an initiator (and a promoter if one is used). Polymerization takes place when the two parts are contacted and polymerization with resultant adhesive bonding takes place.

According to one embodiment of the present invention, the activator portion is prepared by combining a solvent and a reducing agent. Generally, solvents useful in the present invention are capable of being absorbed by the end substrate, but also are capable of absorbing the reactive components of the activator part of the adhesive. Examples of solvents useful in the present invention include, but are not limited to, methyl ethyl ketone (or 2-butone), toluene, acetone, methyl methacrylate monomer, and the like and mixtures thereof. In one embodiment of the present invention, the solvent is methyl ethyl ketone. In another embodiment of the present invention, the solvent is methyl methacrylate monomer.

Solvents useful in the present invention are present generally in an amount in the range of up to 95 weight percent, based on the weight of the adhesive. However, the proper amount of solvent may vary depending on the type of substrate the adhesive will be used. In one embodiment of the present invention, the solvent is present in an amount in the range of from about 5 to about 90 weight percent. In another embodiment of the present invention, the solvent is present in an amount in the range of from about 8 to about 80 weight percent. In another embodiment of the present invention, the solvent is present in an amount in the range of from about 10 to about 70 weight percent. The activator portion of the adhesive may be prepared by any method known to one of skill in the art such as for example, using a batch mixer.

The activator portion is then applied to the desired substrate in any manner known to one skilled in the art, including by way of example, but not limited to, spraying, brushing, and rolling. According to one embodiment of the present invention, the activator portion contains both solvent and reactive components, and when applied to the substrate, is partially or completely absorbed by the substrate. Generally, the activator is absorbed by the substrate in less than one minute, but longer times may be experienced depending on environmental conditions. After the activator is applied, the substrate contains no wet residue on its surface.

The treated substrate, with the absorbed activator, now having an activated surface is ready to use immediately, or at a later time. According to one embodiment of the present invention, the activated substrate can be used for a period of time of up to about three (3) months from when the activator is applied. In another embodiment of the present invention, the activated substrate can be used for a period of time in the range of from about one (1) month to about two (2) months from when the activator is applied. In another embodiment of the present invention, the treated substrate can be used for a period of time in the range of from about eight (8) to ten (10) weeks from when the activator is applied. In another embodiment of the present invention, the treated substrate can be used for a period of time in the range of from about three (3) weeks to about five (5) weeks from when the activator is applied.

Adhesives of the present invention can be used on various materials or substrates known in the art. Examples of such materials or substrates include, but are not limited to, thermoplastic and thermoset engineering plastics, such as PVC (Polyvinyl chloride), ABS (Acrylonitrile-Butadiene-Styrene), FRP (Fiber Reinforced Plastics), PC (Polycarbonate), PS (Poly styrene) and the like and blends thereof. Other materials or substrates useful in the present invention include unprepared metals, painted metals, such as CRS (Cold Rolled Steel), SS (Stainless Steel), and aluminum and the like and blends thereof, as well as oil and water contaminated surfaces. Adhesives of the present invention can be used in various applications such as PVC or pipe bonding, and other bonding/laminating applications.

Application of the Adhesive

According to one embodiment of the present invention, the adhesive portion of the adhesive is applied to the activated-surface of the substrate. The adhesive portion may be applied to the substrate in any manner known to one of skill in the art, for example by spraying, rolling, or painting. When contacted, the two parts mix together and polymerization with resultant adhesive bonding takes place. In another embodiment of the present invention, the adhesive is applied to a non-activated substrate. The non-activated substrate (containing adhesive) may then be contacted with an activated substrate in accordance with the present invention. When the non-activated substrate (containing adhesive) and the activated substrate (containing activator) are contacted, the activator from the activated substrate may be absorbed by the adhesive, and the interaction between the substrates will initiate the cure allowing for adhesive bonding to take place.

The following examples are presented to further illustrate the present invention and are not to be construed as limiting the invention.

EXAMPLES

Example I

Table I

Adhesives of the present invention were formulated using techniques known to one skilled in the art as exemplified in U.S. Pat. Nos. 4,959,288 and 5,206,288, the entireties of which are incorporated by reference. As shown in Table I, a composition of the adhesive part was prepared by mixing together acrylic-based monomers, including both low and high molecular weight monomers, and a carboxylic acid in the quantities indicated. In addition, an oxidizing agent, stabilizer, vapor suppressant, and color were also added.

Example II

Table II

A composition of the activator part of the adhesive is shown in Table II. Such composition was prepared by combining a reducing agent, a solvent, and promoter.

Example III

Table III

The activator part of Example II was prepared and applied to PVC pipe as indicated in Table III. The method of application, the time it took for the substrate to absorb the activator, and the appearance of the substrate after absorption, are included in Table III.

Example IV

Table IV

A composition of the adhesive part prepared in accordance with Example I was combined with the PVC pipe substrates (with activated surfaces) as indicated in Table IV. The adhesive, however, was applied to the substrates at various times after the activator had been applied to the substrates as indicated in Table IV. Thereafter, various tests were performed to determine the strength of the adhesive bond. As noted, the adhesive performed just as well on the pipe samples that were activated recently as those samples that had been activated for a long period of time.

Example V

Table V

As shown in Table V, a composition of the adhesive part tailored for laminating/bonding applications was prepared by mixing together acrylic-based monomers, including both low and high molecular weight monomers, a carboxylic acid, and impact modifiers in the quantities indicated. In addition, an oxidizing agent, stabilizer, vapor suppressant, and color were also added.

Example VI

Table VI

A composition of the activator part of the adhesive tailored for laminating/bonding applications is shown in Table VI. Such composition was prepared by combining a reducing agent, a solvent, and promoter.

Example VII

Table VII

The activator part of Example VI was prepared and applied to various substrates (ABS, PS and FRP) as indicated in Table VII. The method of application, the time it took for the substrate to absorb the activator, and the appearance of the substrate after absorption, are included in Table VII. Thereafter, a composition of the adhesive part prepared in accordance with Example V was combined with the ABS, PS, and FRP substrates (with activated surfaces), and a lap shear test was performed to determine the strength of the adhesive bond.

Example I

TABLE I

| ADHESIVE SIDE | | |
|---|---|---|
| ADHESIVE | | A |
| ADHESIVE SIDE | Chemical Class | % By Weight |
| Methyl methacrylate | Monomer | 59.9 |
| Hypalon 30 | Elastomer (Sulfur-containing component) | 28 |
| Antioxidant BHT | Stabilizer | 0.5 |
| Cumene Hydroperoxide | Oxidizing Agent | 0.5 |
| Methacrylic Acid (Glacial) | Acid | 8 |
| Sartomer 350 Monomer | Monomer (trimethylolpropane trimethacrylate) | 2.5 |
| Blue | Color | 0.1 |
| Wax, Boler 1977 Paraffin | Vapor suppressant | 0.5 |

Example II

TABLE II

| ACTIVATOR SIDE | | |
|---|---|---|
| ADHESIVE | | A |
| ACTIVATOR SIDE | Chemical Class | % By Weight |
| Methyl Ethyl Ketone or Methyl Methacrylate Monomer | Solvent/Monomer | 88 |
| Reillcat AST-2 Accelerator | Reducing Agent | 11.992 |
| Copper acetyl Acetonate | Catalyst | .008 |

Example III

TABLE III

| | SUBSTRATE | | |
|---|---|---|---|
| Activator A | PVC Sample 1 | PVC Sample 2 | PVC Sample 3 |
| Method of Application | Brushed | Sprayed | Rolled |
| Time of Absorption | 30-40 sec. | 30-40 sec. | 30-40 sec. |
| Appearance of Substrate post absorption | Dry, Dark Yellow/Amber | Dry, Dark Yellow/Amber | Dry, Dark Yellow/Amber |

Example IV

TABLE IV

|  | Adhesive + PVC Sample 1 | Adhesive + PVC Sample 2 |
|---|---|---|
| Length of time substrate has been activated | Less than 2 hours | 10 weeks |
| Bond strength | 345 lbs. on 1" PVC pipe fitting and 1" flexible PVC hose. Substrate failure | 338 lbs. on 1" PVC pipe fitting and 1" flexible PVC hose. Substrate failure |
| PVC/PVC Lap Shear | 838 psi. Substrate failure | 845 psi. Substrate failure |

Example V

TABLE V

ADHESIVE SIDE (Laminating/Bonding Application)

| ADHESIVE | | A |
|---|---|---|
| ADHESIVE SIDE | Chemical Class | % By Weight |
| Methyl methacrylate | Monomer | 57.30 |
| Hypalon 30 | Elastomer (Sulfur-containing component) | 17.30 |
| Antioxidant BHT | Stabilizer | 0.20 |
| Cumene Hydroperoxide | Oxidizing Agent | 0.40 |
| Methacrylic Acid (Glacial) | Acid | 8.00 |
| Light Ester P-2M |  | 3.00 |
| Blue Dye | Color | 0.20 |
| Wax, Boler 1977 Paraffin | Vapor suppressant | 0.80 |
| USA KMBTA 753 | Impact Modifier | 11.80 |
| 8 mil Beads |  | 1.0 |

Example VI

TABLE VI

ACTIVATOR SIDE (Laminating/Bonding Application)

| ADHESIVE | | A |
|---|---|---|
| ACTIVATOR SIDE | Chemical Class | % By Weight |
| Methyl Ethyl Ketone or Methyl Methacrylate Monomer | Solvent/Monomer | 87.900000 |
| Reillcat AST-2 Accelerator | Reducing Agent | 11.99985 |
| Copper acetyl Acetonate | Catalyst | .00015 |
| Powder 610400 (Red) | Color | 0.10000 |

Example VII

TABLE VII

| | SUBSTRATE | | |
|---|---|---|---|
| Activator A | ABS | PS | FRP |
| Method of Application | Spray | Spray | Spray |
| Time of Absorption | 30-50 sec. | 40-60 sec. | 40-60 sec. |
| Appearance of Substrate post absorption | Dry, Yellow/ Amber | Dry, Yellow/ Amber | Dry, Yellow/ Amber |
| Lap Shear (post contact with adhesive) | 878 psi. Substrate failure | 934 psi. Substrate failure | 988 psi. Substrate failure |

What is claimed is:

1. A method for adhesive bonding using a two-part adhesive having an activator part and an adhesive part comprising:
   (1) contacting a substrate with the activator part to form a treated substrate, the activator part comprising a solvent, which contains either methyl ethyl ketone or methyl methacrylate monomer, or both, and dihydropyridine, to form a treated substrate;
   (2) contacting the treated substrate with the adhesive part, the adhesive part comprising methyl methacrylate, at least one sulfur-containing compound, and cumene hydroperoxide;
   wherein the activator part is partially or completely absorbed by the substrate, and wherein the treated substrate does not contain a residue and remains active for bonding with the adhesive part for a period of time up to about 10 weeks from forming the treated substrate.

2. A method of activating the surface of a substrate for use with adhesive bonding comprising:
   contacting a substrate with a reactive solvent and at least one pyridine reducing agent, wherein the reactive solvent and at least one pyridine reducing agent are at least partially absorbed by the substrate to form an activated surface, wherein the activated surface contains no residue and remains active for adhesive bonding for up to at least about 10 weeks.

3. The method of claim 2, wherein the reactive solvent is selected from the group consisting of methyl ethyl ketone, methyl methacrylate monomer, and a mixture thereof.

4. The method of claim 2, wherein the reactive solvent is methyl ethyl ketone.

5. The method of claim 2, wherein the reactive solvent is present in an amount in the range of from about 5 to about 90 weight percent.

6. The method of claim 2, wherein the at least one pyridine reducing agent is dihydropyridine.

7. The method of claim 2, wherein the activated surface remains active for adhesive bonding in the range of from about 1 month to about 2 months from when the activated surface is formed.

8. The method of claim 2, wherein the activated surface remains active for adhesive bonding in the range of from about 3 weeks to about 5 weeks from when the activated surface is formed.

9. The method of claim 2, wherein the activated surface remains active for adhesive bonding in the range of from about 8 to about 10 weeks from when the activated surface is formed.

10. The method of claim 2, wherein the reactive solvent and at least one pyridine reducing agent are sprayed onto the substrate.

11. The method of claim 2, wherein the reactive solvent and at least one pyridine reducing agent are rolled onto the substrate.

12. The method of claim 2, wherein the substrate is selected from the group consisting of thermoplastic materials, thermoset engineering plastics, metal and mixtures thereof.

13. The method of claim 2, wherein the substrate is selected from the group consisting of PVC (polyvinyl chloride), ABS (acrylonitrile-butadiene-styrene), FRP (fiber reinforced plastics), PC (polycarbonate), PS (poly styrene) and the like and mixtures thereof.

14. The method of claim 2, wherein the substrate is selected from the group consisting of unprepared metals, painted metals, oil-contaminated surfaces and water-contaminated surfaces.

15. A method of activating the surface of a substrate for use with adhesive bonding comprising:
contacting a substrate with a reactive solvent comprising methyl ethyl ketone and at least one pyridine reducing agent, wherein the reactive solvent and at least one pyridine reducing agent are at least partially absorbed by the substrate to form an activated surface, wherein the activated surface contains no residue and remains active for adhesive bonding for up to at least about 10 weeks.

16. The method of claim 15, wherein the reactive solvent further comprises methyl methacrylate monomer.

17. The method of claim 15, wherein the reactive solvent is present in an amount in the range of from about 5 to about 90 weight percent.

18. The method of claim 15, wherein the at least one pyridine reducing agent is dihydropyridine.

19. The method of claim 15, wherein the activated surface remains active for adhesive bonding in the range of from about 1 month to about 2 months from when the activated surface is formed.

20. The method of claim 15, wherein the activated surface remains active for adhesive bonding in the range of from about 3 weeks to about 5 weeks from when the activated surface is formed.

21. The method of claim 15, wherein the activated surface remains active for adhesive bonding in the range of from about 8 to about 10 weeks from when the activated surface is formed.

22. The method of claim 15, wherein the reactive solvent and at least one pyridine reducing agent are sprayed onto the substrate.

23. The method of claim 15, wherein the reactive solvent and at least one pyridine reducing agent are rolled onto the substrate.

24. The method of claim 15, wherein the substrate is selected from the group consisting of thermoplastic materials, thermoset engineering plastics, metal and mixtures thereof.

25. The method of claim 15, wherein the substrate is selected from the group consisting of PVC (polyvinyl chloride), ABS (acrylonitrile-butadine-styrene), FRP (fiber reinforced plastics), PC (polycarbonate), PS (poly styrene) and the like and mixtures thereof.

26. The method of claim 15, wherein the substrate is selected from the group consisting of unprepared metals, painted metals, oil-contaminated surfaces and water-contaminated surfaces.

27. A method of activating the surface of a substrate for use with adhesive bonding comprising:
contacting a substrate with a reactive solvent and at least one pyridine reducing agent, wherein the substrate is selected from the group consisting of unprepared metals, painted metals, oil-contaminated surfaces and water-contaminated surfaces, and wherein the reactive solvent and at least one pyridine reducing agent are at least partially absorbed by the substrate to form an activated surface, wherein the activated surface contains no residue and remains active for adhesive bonding for up to at least about 10 weeks.

28. The method of claim 27, wherein the reactive solvent is selected from the group consisting of methyl ethyl ketone, or methyl methacrylate monomer, or a mixture thereof.

29. The method of claim 27, wherein the reactive solvent is methyl ethyl ketone.

30. The method of claim 27, wherein the reactive solvent is present in an amount in the range of from about 5 to about 90 weight percent.

31. The method of claim 27, wherein the at least one pyridine reducing agent is dihydropyridine.

32. The method of claim 27, wherein the activated surface remains active for adhesive bonding in the range of from about 1 month to about 2 months from when the activated surface is formed.

33. The method of claim 27, wherein the activated surface remains active for adhesive bonding in the range of from about 3 weeks to about 5 weeks from when the activated surface is formed.

34. The method of claim 27, wherein the activated surface remains active for adhesive bonding in the range of from about 8 to about 10 weeks from when the activated surface is formed.

35. The method of claim 27, wherein the reactive solvent and at least one pyridine reducing agent are sprayed onto the substrate.

36. The method of claim 27, wherein the reactive solvent and at least one pyridine reducing agent are rolled onto the substrate.

* * * * *